United States Patent
Skytta

[15] 3,704,921
[45] Dec. 5, 1972

[54] BEARING BOX SUPPORT FOR THE SHAFT OF A DRYING CYLINDER IN A PAPER MACHINE

[72] Inventor: Osmo Skytta, Kauppakatu 27 C, Jyvaskyla, Finland

[22] Filed: June 25, 1970

[21] Appl. No.: 49,679

[52] U.S. Cl. ..................................308/22, 34/121
[51] Int. Cl. ..............................F16c 29/00
[58] Field of Search .......308/15, 22, 26, DIG. 7, 3 R; 248/26, DIG. 1; 34/121

[56] References Cited

UNITED STATES PATENTS

| | | | |
|---|---|---|---|
| 1,050,177 | 1/1913 | Seaman | 308/22 |
| 2,976,093 | 3/1961 | Reiling | 308/DIG. 7 |
| 2,578,552 | 12/1951 | Hornbostel | 34/121 |
| 3,243,236 | 3/1966 | Graham | 308/3 |
| 3,359,646 | 12/1967 | Beachler | 34/121 |
| 3,484,882 | 12/1969 | Blanchette | 308/3 R |
| 3,520,096 | 7/1970 | Kilcher | 308/3 R |

FOREIGN PATENTS OR APPLICATIONS

| | | | |
|---|---|---|---|
| 849,046 | 7/1949 | Germany | 308/15 |

*Primary Examiner*—Martin P. Schwadron
*Assistant Examiner*—Barry Grossman
*Attorney*—Richards & Geier

[57] ABSTRACT

A bearing box support for a paper machine is shown. The structure includes a pair of upwardly extending support arms which carry the bearing box. Upon the mating surfaces of the support arm and bearing box a self-lubricating coating is provided. Structure is provided to permit the bearing box to move in an axial direction but not in a rotatable manner.

1 Claim, 2 Drawing Figures

PATENTED DEC 5 1972 3,704,921

INVENTOR
OSMO SKYTTA

Richards & Geier

ATTORNEYS

BEARING BOX SUPPORT FOR THE SHAFT OF A DRYING CYLINDER IN A PAPER MACHINE

DESCRIPTION OF THE INVENTION

This invention relates to a bearing box support particularly for a paper machine. In modern paper machines the drying cylinders are of considerable length. By reason thereof the drying cylinders are not necessarily at a uniform temperature throughout their length. The temperature variations cause such great changes in length of the drying cylinders that the bearing box shaft of the drying cylinder must be free to move in the direction of the axis of the drying cylinder. Heretofore there have been such bearing box supports developed but each of the former types are unsatisfactory. In one type of known bearing box support the bearing box is support by turnable and movable cones. In the other known type of bearing box support the bearing box is supported by sets of springs. The spring method of support is highly awkward, expensive and unsatisfactory, while the use of cones causes high pressures to be produced per unit surface and thus unsatisfactory support is provided if there are bending moments. Furthermore, when cones are utilized, additional dog elements are required to counteract torsion and mounting is also difficult.

The present invention avoids the difficulties encountered with the prior art structures. In the bearing box support of this invention there is a body portion which is separate from the bearing box and from which project upwardly a pair of support arms against which the bearing box rests by support lugs attached to its sides. The mating surfaces between the bearing box support arm and the bearing box itself is provided with a self-lubricating coating. Also, optionally, in the lower part of the bearing box there is a guiding projection which enters a guiding groove in the lower support which guiding groove is parallel to the bearing box.

As a result of this construction simple fool-proof and relatively inexpensive bearing box support is provided which is considerably superior to previous designs.

Furthermore, excellent support of the bearing box is achieved and even high loads cause no difficulty because the supporting surfaces can be made as large as required for any given application. Furthermore, by reason of the self-lubricating coating involved, the friction between mating surfaces has been made very small and good guidance in the axial direction is assured.

Mounting is also very simple.

Instead of a self-lubricating coating a piece of fluorocarbon resin such as Teflon may be utilized which is attached to a groove in the mating surface of the support and projects from this groove. Also, preferably, the mating faces of the lower support and of the support lugs on the sides of the bearing box are located at least approximately in the horizontal central plane of the bearing box.

The above sets forth a brief description of this invention and some of the objects and advantages thereof. Other objects and advantages of this invention will become apparent to the reader of this specification as the description proceeds.

The invention will now be further described by reference to the accompanying drawings that are made a part of this specification.

Figure 1:
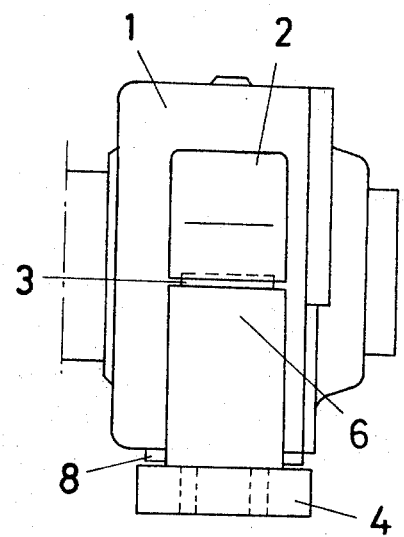
FIG. 1 is a front elevational view of a bearing box including the support of this invention.
Figure 2:
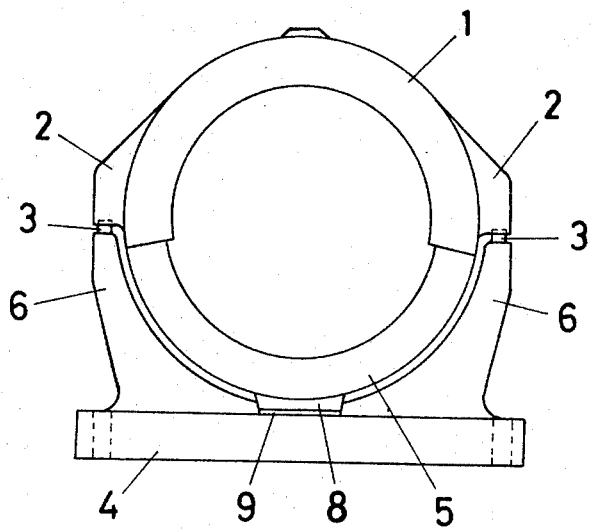
FIG. 2 is an end view of the structure shown in FIG. 1.

The invention will now be further described by reference to the specific form thereof as shown in the accompanying drawings. In this connection, however, the reader is cautioned to note that such specific form of this invention is for illustrative purposes and for purposes of example only. Various changes and modifications can obviously be made within the spirit and scope of this invention without departing therefrom.

The bearing box 1 of this invention is provided with a pair of sides to which support lugs 2 are affixed. Lugs 2 extend approximately to the horizontal central plane of the bearing box. On the downwardly directed horizontal ends of each of lugs 2 is a groove into which there is recessed a body 3 made of a self-lubricating material such as a fluorocarbon plastic. Teflon, a plastic manufactured by E. I. Dupont de Nemurs and Company is preferred. Body 3 projects from the groove and abuts support arms 6 which in turn are carried by body portion 4 of the lower support which is mounted on a paper machine. A semi-circular holder 5 bears a downwardly directed guiding projection 8 which is disposed within a guide groove 9 which is parallel to the bearing box and located in the bottom of the holder part 5 of the lower support.

The operation of this invention will now be explained. The lower support 4 carries the holder 5 with its arms 6 bearing against bodies 3 of self-lubricating material. The friction between the abutting surfaces of the supporting arms and the bearing box is thus small. Consequently, it is relatively simple to displace bearing box 1 in its axial direction. It is also noted that the holder in the lower support is slightly larger than the half in the bearing member that will be placed into it. The guiding projection 8 which enters the guiding groove 9, prevents the bearing box from rotating. However, since the groove and projection construction is provided as illustrated, it is possible to displace the bearing box support in longitudinal direction.

It is also obvious that the size of members 3 can be made of any desired amount. Thus axial displacement of the bearing box is possible at high loads.

The foregoing sets forth the manner in which the objects of this invention are achieved.

I Claim:

1. In a structure having a bearing box and its support and a shaft, said shaft being rotatably carried by said bearing box, the improvement that comprises a pair of support lugs on opposite sides of said bearing box in the same horizontal plane, said support lugs being provided with a groove, a self-lubricating material within said groove, said self-lubricating material resting upon said support arms, said support having a body portion and a pair of arms projecting upwardly therefrom, each of said arms abutting one of said support lugs, and a self-lubricating coating disposed upon said abutting surfaces of said support arms and support lugs, and means carried by said bearing box and said support beneath said horizontal plane to prevent rotational movement of said bearing box, said structure permitting movement of said bearing box with said shaft in axial direction along said support.

* * * * *